United States Patent [19]

Wass

[11] 4,144,369
[45] Mar. 13, 1979

[54] COMPOSITE DECK PANEL

[75] Inventor: Brian J. Wass, Derby, England

[73] Assignee: Redpath Dorman Long Limited, Bedford, England

[21] Appl. No.: 835,794

[22] Filed: Sep. 22, 1977

[30] Foreign Application Priority Data

Aug. 27, 1976 [GB] United Kingdom ............. 35791/76

[51] Int. Cl.² .......................... B32B 3/28; B32B 3/30
[52] U.S. Cl. ..................................... 428/183; 52/336;
52/450; 52/453; 52/334; 428/179; 428/180;
428/182; 428/167
[58] Field of Search ............. 428/179, 182, 184, 180,
428/183, 156, 167; 52/450, 451, 452, 453, 618,
630, 625, 674, 336, 334

[56] References Cited

U.S. PATENT DOCUMENTS 3,462,902  8/1969  Albrecht et al. ................. 52/452
3,812,636  5/1974  Albrecht et al. ................. 52/450

FOREIGN PATENT DOCUMENTS 2616058 11/1976 Fed. Rep. of Germany.
984236 2/1965 United Kingdom.
1090381 11/1967 United Kingdom.

Primary Examiner—George F. Lesmes
Assistant Examiner—P. Thibodeau
Attorney, Agent, or Firm—Bacon & Thomas

[57] ABSTRACT

A corrugated sheet for use as part of a composite concrete deck comprising parallel spaced crest surfaces connected to parallel spaced soffit surfaces by upstanding connecting web surfaces that converge towards each other as they approach a common crest surface, all the crest, soffit and web surfaces being generally planar with at least the crest surfaces furthermore being provided with upstanding, continuous, longitudinally extending beads made from the crest surface material and with laterally extending upstanding projections running between the beads and connecting them together. The panels between the beads and the projections function as shear panels. An alternate embodiment provides shear panels that are slightly depressed with respect to the surrounding surface material, projections that have flat upper surfaces, and a panel edge portion that is shaped to enable the panels to be secured together in overlapping relationship. The web and soffit surfaces may also be provided with beads and cross projections.

12 Claims, 6 Drawing Figures

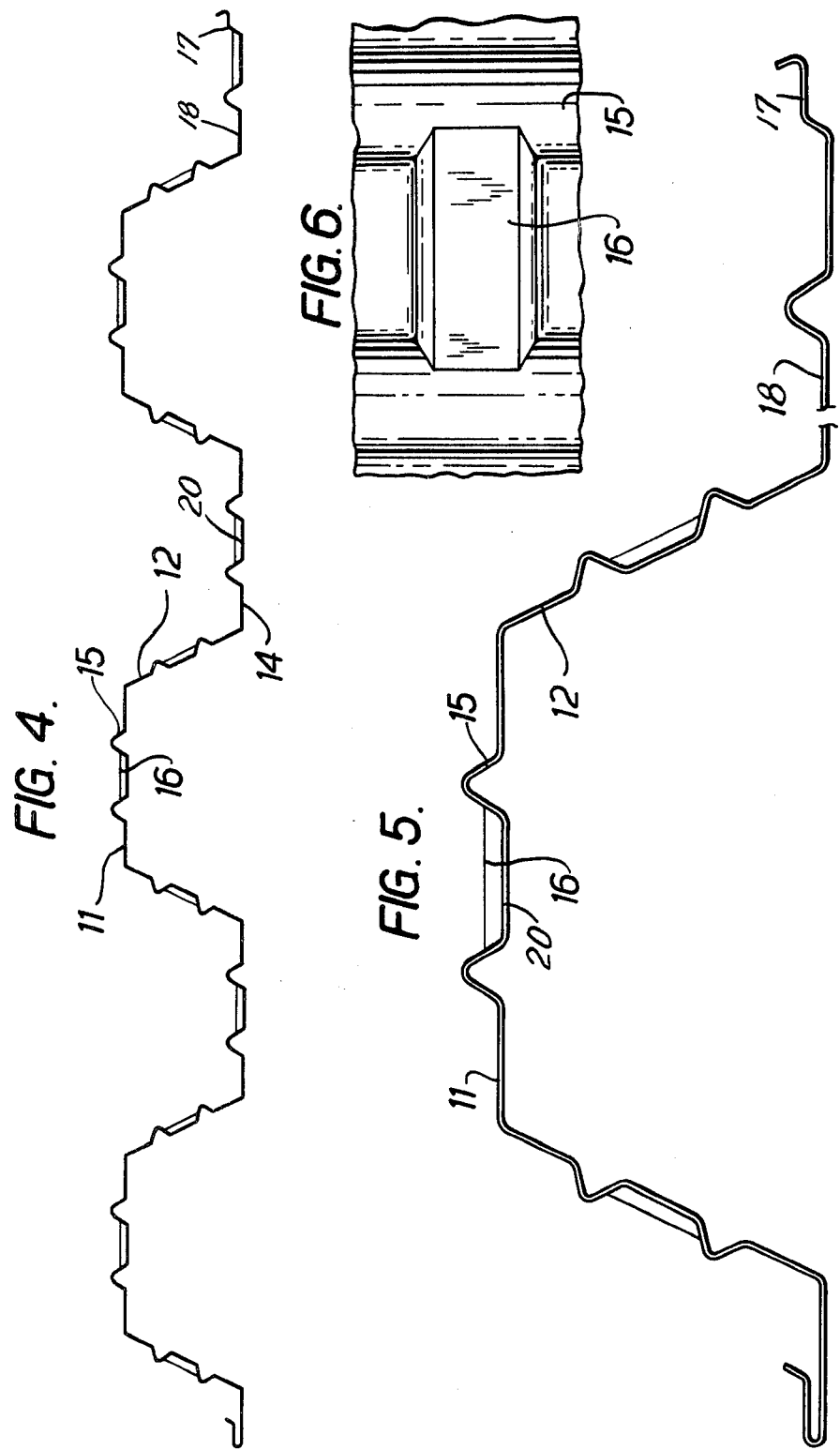

COMPOSITE DECK PANEL

The invention relates to composite decks.

With advances in the development of metal sheets for composite decks, particularly where higher strength materials are used and deeper profiles are called for, the relative thickness of the sheet material in proportion to the lateral dimension of the deck is reduced, so increasing the propensity towards web or compression flange buckling. To overcome this it is recognised that stiffeners such as beads can be introduced in critical areas. In the compression flange these would be longitudinal and in the web they would be vertical.

These beads are necessary mainly where the sheet section is used as shuttering, and are less important when the concrete has hardened.

When metal sheets are used in co-action with concrete to produce a composite deck, it is becoming increasingly apparent that it is advantageous for each part of the sheet to be made as inherently stiff as possible to inhibit separation at the sheet/concrete interface.

The present invention is concerned with a section for use both as a permanent shutter and as a co-action deck, by virtue of the formation of stiffened panels in the sheet.

The invention provides a corrugated sheet for use as part of a composite deck comprising parallel spaced crest surfaces connected to parallel spaced soffit surfaces by upstanding connecting web surfaces that converge towards each other as they approach a common crest surface, all the crest, soffit and web surfaces being generally planar and at least the crest surfaces including upstanding, continuous crest beads made from crest surface material extending parallel to the length of the crest surfaces and to each other, and said crest surfaces also including a plurality of upstanding crest cross projections also made from crest surface material extending between and connecting the longitudinal beads at spaced intervals along the length of the crest surfaces. The crest surfaces lying within the projections and the beads constitute shear panels that may be co-planar with the surrounding surface material or slightly depressed with respect thereto.

It is important that the projections run into the beads at their ends, so forming a continuous rim around the shear panels.

It is preferred that the (or another) pattern of beads and projections as aforesaid is formed in web portions of the sheet extending between the soffit surface and the crest portions.

It is also preferred that the (or another) pattern of beads and projections is formed on the planar soffit surface.

Preferably the beads and projections are formed upwardly from the corrugated sheet.

It is further preferred that the beads are curved upwardly such that there is a sharp angle between the junction between the beads and the remainder of the crest portion of the sheet (or the web portions or the soffit surfaces as may be).

Advantageously the axes of the projection are perpendicular to the axes of the ribs, thus forming rectangular panels.

If the projections did not run into the beads difficulties might arise in rolling the sheet to obtain the profile. Specifically the edges of the sheet might curve upwardly. This curvature might be obviated by stretching the sheet laterally as the projections are formed, but it is believed to be particularly advantageous to have the projections running into the beads.

The invention includes a composite deck comprising concrete poured onto and hardened upon a sheet of the kind set forth above.

Two specific embodiments of the invention will now be described by way of example with reference to the accompanying drawings in which:

FIG. 4 is a part cross section showing another sheet,

FIG. 5 is an end view of the whole of that sheet, and

FIG. 6 is a scrap view on the arrow VI in FIG. 5.

Figure 1:
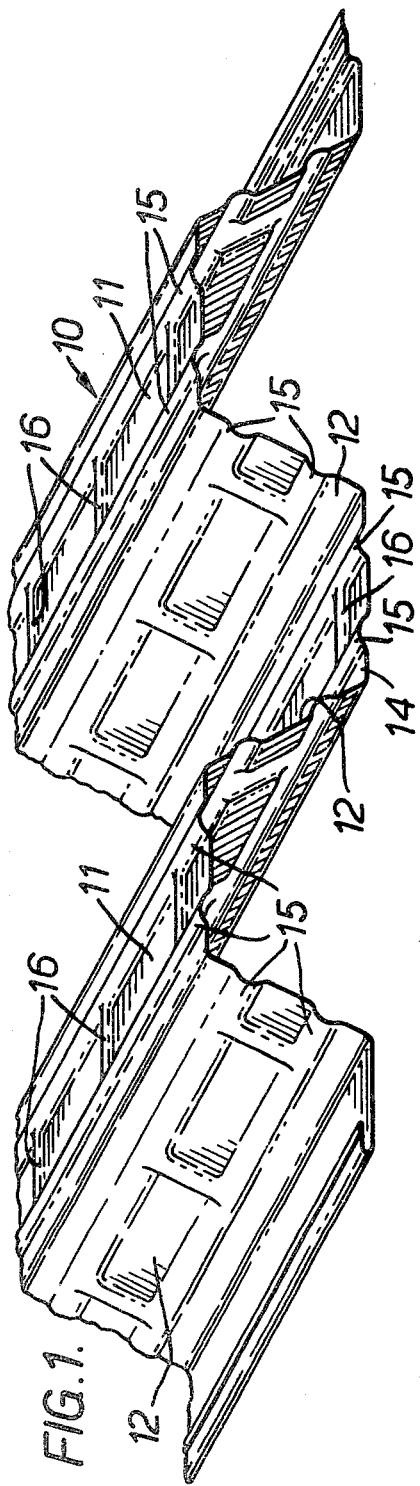
FIG. 1 is a perspective view of a part of a first sheet.
Figure 3:
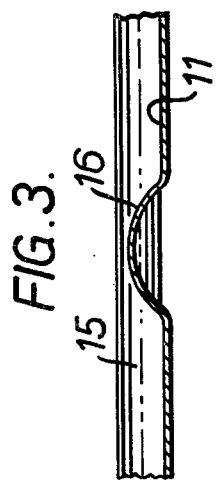
FIG. 3 is a section across the line III—III in FIG. 2.

As shown in FIG. 1 a corrugated sheet 10 has a Welsh hat configuration of straight parallel ribs each of which comprises a crest surface or portion 11, connected to lower soffit surfaces 14 by web surfaces 12. Web and soffit surfaces are distinct from one another, and are all generally planar. The web surfaces connected to a common crest surface are tapered towards each other as they approach the crest surface to which they are connected.

In this embodiment the sheet is considered to have been rolled, but it is within the scope of the invention to press form the sheet, which process may be particularly advantageous with very deep sections.

The crest portion has two longitudinal beads 15 rolled upwardly thereon. The two beads are continuous along the crest portion, and are mutually parallel to each other, and to the longitudinal axes of the ribs.

Between the two beads 15 there is a series of lateral projections 16 which extend between and connect the beads. In the illustrated example, the projections are elongated with their longer axes perpendicular to the axes of the ribs.

Figure 2:
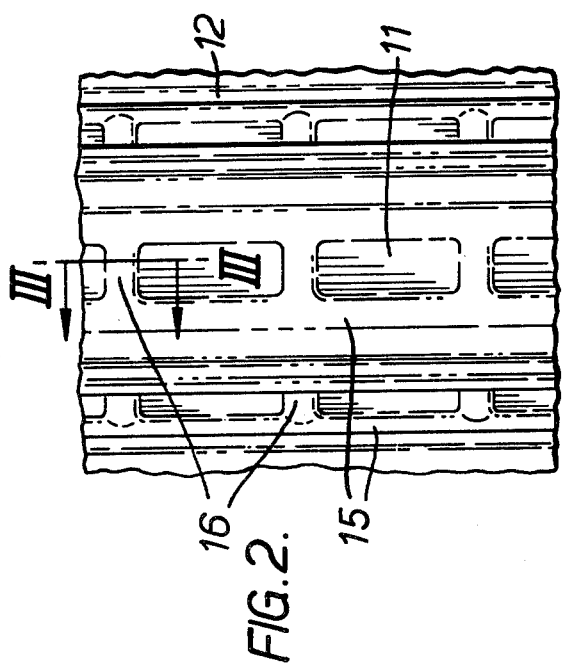
FIG. 2 is a plan showing a pattern of beads and projections formed on a crest of the sheet shown in FIG. 1

As may be seen from FIGS. 1 and 2, the pattern of beads 15 and projections 16 is repeated on the webs 12 and the soffit surface 14, although this is not essential.

FIGS. 4 to 6 illustrate another sheet in which like reference numerals designate like items. The sheet shown in these figures has somewhat sharper beads, and somewhat flatter projections (as shown in FIG. 6). The sheet has three ribs, and at its lateral edge portions 17 there are engaging detents in the form of upturned flanges adjacent edge soffit surfaces 18 with single beads extending therealong, so that the sheets can be joined together in side by side relation. In this sheet the central portion 20 of the panels are slightly depressed with respect to the general planes of the crests, webs, and soffit surface.

The beads inter alia restrict canning during manufacture, and the projections inter alia act as keys when concrete is poured on the sheet to form a composite deck.

More specifically, longitudinal beads in the crest portion, which may be used as an upper compression flange give stability against buckling due to bending and the cross projections act as stiffeners to inhibit vertical deflection of the flange, and also to form complete rectangular panels in the sheet. When filled with concrete these panels produce shear resisting castellations in the hardened concrete.

Similarly the interconnecting panels are formed in the webs of the sheet to prevent vertical displacement, improve interface bond and improve the buckling stability of the web against shear loads.

Panels formed in the soffit surface lower flange (soffit surface) give further slip resistance and produce as far as possible an average interface bond resistance. Additionally the panels stiffen the lower flange against buckling when that flange comes into compression — e.g. when the sheet passes over an intermediate wall or support.

We claim:

1. A corrugated sheet for use as part of a composite deck comprising parallel spaced crest surfaces connected to parallel spaced soffit surfaces by upstanding connecting web surfaces that converge towards each other as they approach a common crest surface, all the crest, soffit and web surfaces being generally planar and at least the crest surfaces including upstanding, continuous crest beads of crest surface material extending parallel to the length of the crest surfaces and to each other, and said crest surfaces also including a plurality of upstanding crest cross projections of crest surface material extending between and connecting the longitudinal beads at spaced intervals along the length of the crest surfaces, whereby spaced crest shear panels bounded by crest beads and projections are provided along the crest surface.

2. The sheet according to claim 1, said web surfaces including upstanding continuous web beads of web surface material extending parallel to the length of the web surfaces and to each other, and said web surfaces also including a plurality of upstanding web cross projections of web surface material extending between and connecting the web beads at spaced intervals along the length of the web surface, the web beads and projections on adjacent web pairs between spaced crest surfaces extending generally towards one another, whereby spaced web shear panels bounded by web beads and projections are provided along the web surfaces.

3. The sheet according to claim 1, said soffit surfaces including upstanding, continuous soffit beads of soffit surface material extending parallel to the length of the soffit surfaces and to each other, and said soffit surfaces also including a plurality of upstanding cross projections of soffit surface material extending between and connecting the soffit beads at spaced intervals along the length of the soffit surfaces, whereby spaced soffit shear panels bounded by soffit beads and projections are provided along the soffit surfaces.

4. The sheet according to claim 1, said crest beads and crest projections being formed by bending the crest surface material.

5. The sheet according to claim 4, said crest beads and crest projections intersecting the respective crest surfaces at a sharp angle.

6. The sheet according to claim 1, said crest projections intersecting said crest beads at a perpendicular angle.

7. A sheet according to claim 1, said web surfaces including upstanding continuous web beads of web surface material extending parallel to the length of the web surfaces and to each other, and said web surfaces also including a plurality of upstanding web cross projections of web surface material extending between and connecting the web beads at spaced intervals along the length of the web surfaces, the web beads and projections on adjacent web pairs between spaced crest surfaces extending generally towards one another; said soffit surfaces including upstanding continuous soffit beads of soffit surface material extending parallel to the length of the soffit surfaces and to each other, and said soffit surfaces also including a plurality of upstanding cross projections of soffit surface material extending between and connecting the said beads at spaced intervals along the length of the soffit surfaces.

8. The sheet according to claim 7, said crest, web and soffit beads having substantially identical upstanding heights, and said crest, web and soffit projections having an upstanding height less than the upstanding height of the respective beads.

9. The sheet according to claim 7, the sheet having edge portions extending parallel to said crest, web and soffit surfaces, an edge soffit surface extending parallel to and adjacent said edge portion, said edge soffit surface being generally planar and being connected to an adjacent crest surface by an edge web surface, said edge soffit surface including an upstanding, continuous, centrally located bead formed from the same material as the edge soffit surface and extending along the length of the edge soffit surface, said edge portion being upturned to form a flange.

10. The sheet according to claim 9, said edge soffit surface including laterally extending spaced projections formed of the same material as the soffit surface, said projections extending between and connecting said longitudinal beads on the edge soffit surfaces and said upturned flanges.

11. The sheet according to claim 1, said crest projections having planar upper surfaces extending parallel to the respective crest surfaces.

12. A sheet according to claim 1, said shear panels lying below the plane of the surrounding crest surface material.

* * * * *